(12) United States Patent
Wild et al.

(10) Patent No.: US 11,249,349 B2
(45) Date of Patent: Feb. 15, 2022

(54) LIQUID CRYSTAL DEVICES

(71) Applicant: Flexenable Limited, Cambridge (GB)

(72) Inventors: Barry Wild, Cambridge (GB); William Reeves, Cambridge (GB)

(73) Assignee: Flexenable Limited, Cambridge (GB)

( * ) Notice: Subject to any disclaimer, the term of this patent is extended or adjusted under 35 U.S.C. 154(b) by 0 days.

(21) Appl. No.: 16/913,143

(22) Filed: Jun. 26, 2020

(65) Prior Publication Data
US 2020/0409199 A1 Dec. 31, 2020

(30) Foreign Application Priority Data
Jun. 28, 2019 (GB) .................................... 1909355

(51) Int. Cl.
*G02F 1/1339* (2006.01)

(52) U.S. Cl.
CPC ...... *G02F 1/13394* (2013.01); *G02F 1/13398* (2021.01); *G02F 2201/123* (2013.01)

(58) Field of Classification Search
None
See application file for complete search history.

(56) References Cited

U.S. PATENT DOCUMENTS

| 5,801,796 A * | 9/1998 | Lowe .................... G02F 1/1347 349/155 |
| 5,986,729 A * | 11/1999 | Yamanaka ............ G02F 1/1333 349/79 |
| 2003/0174385 A1* | 9/2003 | Liang ..................... G02F 1/167 359/296 |
| 2003/0206260 A1* | 11/2003 | Kobayashi .......... G02F 1/13473 349/115 |

FOREIGN PATENT DOCUMENTS

| GB | 2334111 A | 8/1999 |
| WO | 2007110909 A1 | 4/2007 |

OTHER PUBLICATIONS

Search Report from Great Britain Patent Application No. 1909355. 8, dated Dec. 10, 2019.

* cited by examiner

*Primary Examiner* — Ryan Crockett
(74) *Attorney, Agent, or Firm* — Dergosits & Noah LLP; Todd A. Noah

(57) ABSTRACT

A liquid crystal (LC) device comprising a stack of at least first and second LC cells in optical series, each of the first and second LC cells comprising two half-cells and LC material contained in a space at least partially defined by spacer structures forming an integral part of one or both half-cells; wherein the arrangement within an active area of the device of the spacer structures in one of the first and second LC cells is different to the arrangement within the active area of the device of the spacer structures in the other of the first and second LC cells; and wherein the difference between the two arrangements comprises an ordered aspect.

13 Claims, 5 Drawing Sheets

LIQUID CRYSTAL DEVICES

CLAIM OF PRIORITY

This application claims priority to Great Britain Patent Application No. 1909355.8, filed Jun. 28, 2019, the content of which is hereby incorporated by reference in its entirety.

FIELD OF THE INVENTION

Liquid crystal (LC) material provides switchable optical properties in many different kinds of devices including e.g. display devices and optics components.

The inventors for the present application are working on the production of LC devices from ultra-thin plastics support films, and in particular the production of LC devices comprising a stack of aligned cells, each cell comprising two half-cells and LC material contained in a space at least partially defined by spacer structures forming an integral part of at least one of the two half-cells.

Testing the quality of resulting multi-cell LC devices comprises observing a backlight through the multi-cell LC device, and the inventors for the present application have observed the occurrence of unintended distinct brightness variations readily visible to the naked eye (indicated by reference numeral 100 in FIG. 7), within the active area of the devices.

There is hereby provided a liquid crystal (LC) device comprising a stack of at least first and second LC cells in optical series, each of the first and second LC cells comprising two half-cells and LC material contained in a space at least partially defined by spacer structures forming an integral part of one or both half-cells; wherein the arrangement within an active area of the device of the spacer structures in one of the first and second LC cells is different to the arrangement within the active area of the device of the spacer structures in the other of the first and second LC cells; and wherein the difference between the two arrangements comprises an ordered aspect.

According to one embodiment, the spacer structures for one of the first and second cells are substantially located at the vertices of a first type of grid pattern, and the spacer structures for the other of the first and second cells are substantially located at the vertices of a different, second type of grid pattern According to one embodiment, the first type of grid pattern comprises a quadrilateral grid pattern and the second type of grid pattern comprises a According to one embodiment, the first and second grid patterns are oriented relative to each other such that none of the sides of the grid units of the first grid pattern align with any of the sides of the grid units of the second grid pattern.

According to one embodiment, the first type of grid pattern comprises an equilateral triangle grid pattern and the second type of grid pattern comprises a quadrilateral grid pattern.

According to one embodiment, the equilateral triangle grid pattern is oriented at an angle of about 15 degrees relative to the quadrilateral grid pattern.

According to one embodiment, the spacer structure arrangements for the first and second LC cells exhibit a common pitch within the active area of the device, and the spacer structure arrangements of the first and second LC cells within the active area of the device are configured such that no spacer structure of one of the two LC cells coincides with any spacer structure of the other of the first and second LC cells in terms of position within the active area of the device.

According to one embodiment, the first type of grid pattern is a square grid pattern, and the second type of grid pattern is a hexagonal grid pattern.

According to one embodiment, the active area of the device comprises output switchable areas and a matrix area, and wherein the first and second types of grid patterns are configured such that all vertices are located outside output switchable areas of the active area.

According to one embodiment, the active area of the device comprises output switchable areas and a matrix area; wherein the first and second grid patterns are both regular grid patterns; and wherein at least one of the first and second grid patterns comprises one or more vertices located in one or more of the output switchable areas.

According to one embodiment, the first and second LC cells each comprise a respective arrangement of pixel electrodes matching the respective grid pattern.

There is also hereby provided a liquid crystal (LC) device comprising a stack of at least first and second LC cells in optical series, each of the first and second LC cells comprising two half-cells and LC material contained in a space created by spacer structures forming an integral part of one or both half-cells; wherein the spacer structures for at least one of the first and second LC cells are arranged wholly randomly within an active area of the device.

There is also hereby provided a liquid crystal (LC) device comprising a stack of at least first and second LC cells in optical series, each of the first and second LC cells comprising two half-cells and LC material contained in a space created by spacer structures forming an integral part of one or both half-cells; wherein an active area of the device comprises output switchable areas and a matrix area; and wherein the spacer structures for at least one of the first and second LC cells are selectively located in the matrix area of the active area of the device, and arranged randomly within the matrix area.

There is also hereby provided a method of producing a liquid crystal (LC) device comprising a stack of at least first and second LC cells in optical series, each of the first and second LC cells comprising two half-cells and LC material contained in a space created by spacer structures forming an integral part of one or both half-cells; wherein the production of each of the first and second LC cells comprises: patterning a spacer structure material layer at least within an active area of the device by an irradiative technique comprising projecting onto the active area a radiation image of a spacer structure pattern for the active area; wherein the radiation image is different between the two LC cells.

According to one embodiment, the radiation image for one of the first and second LC cells is a radiation image of a spacer structure pattern in which the spacer structures are substantially located at the vertices of a first type of grid pattern, and the radiation image for the other of the first and second LC cells is a radiation image of a spacer structure pattern in which the spacer structures for the other of the first and second cells are substantially located at the vertices of a different, second type of grid pattern.

According to one embodiment, the first type of grid pattern comprises a quadrilateral grid pattern and the second type of grid pattern comprises a triangle grid pattern.

According to one embodiment, the first and second grid patterns are oriented relative to each other such that none of the sides of the grid units of the first grid pattern align with any of the sides of the grid units of the second grid pattern.

According to one embodiment, the first type of grid pattern comprises an equilateral triangle grid pattern and the second type of grid pattern comprises a quadrilateral grid pattern.

According to one embodiment, the equilateral triangle grid pattern is at oriented at an angle of about 15 degrees relative to the quadrilateral grid pattern.

According to one embodiment, the radiation images for the first and second LC cells are images of ordered spacer structure patterns both exhibiting a common pitch within the active area of the device, wherein the two ordered spacer structure patterns are configured relative to each other such that no spacer structure of one of the two LC cells coincides with any spacer structure of the other of the two LC cells in terms of position within the active area.

According to one embodiment, the first type of grid pattern is a square grid pattern, and the second type of grid pattern is a hexagonal grid pattern.

According to one embodiment, the active area of the device comprises output switchable areas and a matrix area, and wherein the first and second grid patterns are configured such that all vertices are located outside output switchable areas of the active area.

According to one embodiment, the active area of the device comprises output switchable areas and a matrix area; wherein the first and second grid patterns are both regular grid patterns; and wherein at least one of the first and second grid patterns comprises one or more vertices located in one or more output switchable areas.

According to one embodiment, the first and second LC cells each comprise a respective arrangement of output switchable areas matching the respective grid pattern.

There is also hereby provided a method of producing a liquid crystal (LC) device comprising a stack of at least first and second LC cells in optical series, each of the first and second LC cells comprising two half-cells and LC material contained in a space created by spacer structures forming an integral part of one or both half-cells; wherein the production of at least one of the first and second LC cells comprises: patterning a spacer structure material layer at least within an active area of the device by an irradiative technique comprising projecting onto the active area of the device a radiation image of a spacer structure pattern according to which the spacer structures are arranged randomly within the active area of the device.

There is also hereby provided a method of producing a liquid crystal (LC) device comprising a stack of at least first and second LC cells in optical series, each of the first and second LC cells comprising two half-cells and LC material contained in a space created by spacer structures forming an integral part of one or both half-cells; wherein an active area of the device comprises output switchable areas and a matrix area; and wherein the production of at least one of the first and second LC cells comprises patterning a spacer structure material layer at least within the active area by an irradiative technique comprising projecting onto the active area a radiation image of a spacer structure pattern for the active area of the device, according to which the spacer structures are selectively located in the matrix area of the display area, and are arranged randomly within the matrix area.

BRIEF DESCRIPTION OF THE FIGURES

Embodiments of the invention are described in detail hereunder, by way of example only, with reference to the accompanying drawings, in which.

DETAILED DESCRIPTION

Embodiments of the invention are described below for the example of a LC display device, but the same techniques are equally applicable to other types of multi-cell LC devices, such as adaptive lens devices comprising a stack of LC cells.

Embodiments of the invention are described below for the example of a LC device comprising two LC cells, but the same techniques are equally applicable to LC devices comprising more than two LC cells.

In one example embodiment, the LC display device is an organic liquid crystal display (OLCD) device, which comprises an organic transistor device (such as an organic thin film transistor (OTFT) device) for the control component. OTFTs comprise an organic semiconductor (such as e.g. an organic polymer or small-molecule semiconductor) for the semiconductor channels.

Figure 1:
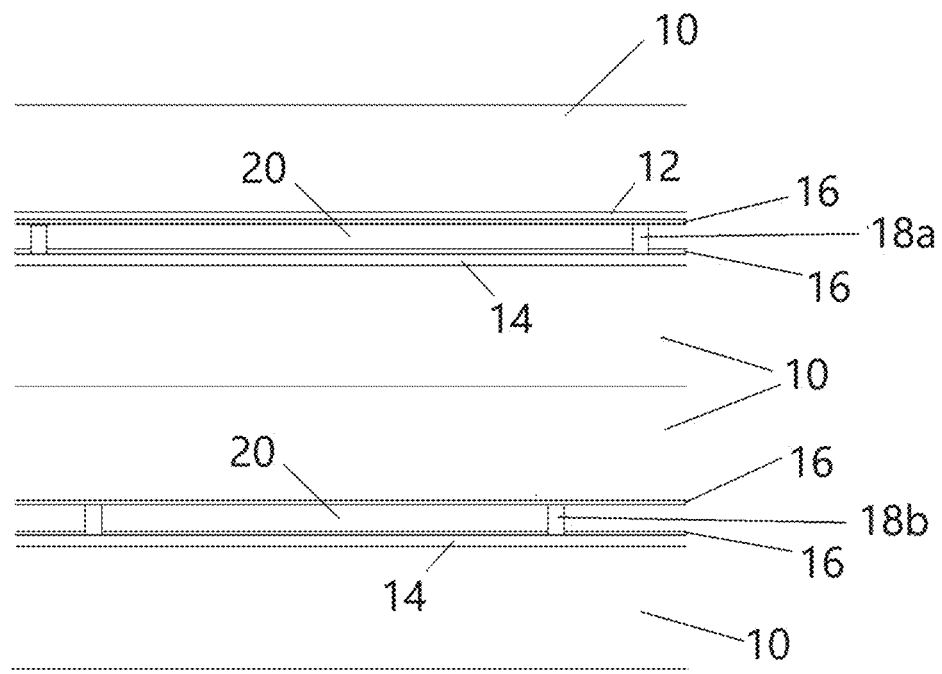
FIG. 1 shows the cross-sectional structure of an example of a LC device comprising a plurality of LC cells.
Figure 2:
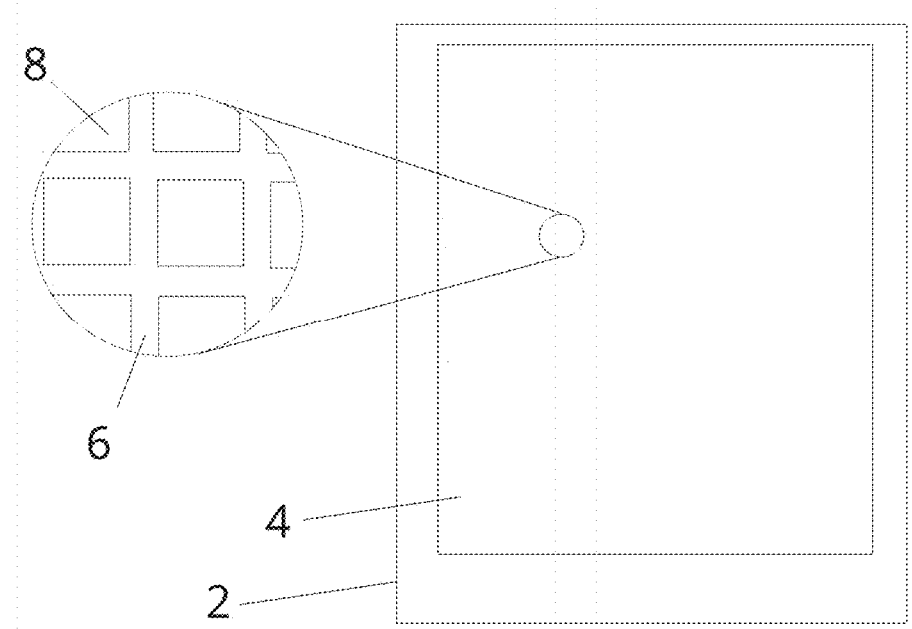
FIG. 2 shows the active area of the LC device of FIG. 1.

With reference to FIGS. 1 and 2, a multi-cell LC display device comprises an active area (display area) 4 within the total area 2 of the device. The area outside the active area 4 may, for example, comprise addressing/routing conductors extending to an array of contacts for bonding to one or more driver chips or to flexible units supporting one or more driver chips (chip-on-flex (COF) units).

Each LC cell comprises two half-cells. In the example of FIG. 1, one half-cell comprises an ultra-thin (e.g. 40 micron) plastics support film 10 supporting at least: a stack of layers defining electrical control circuitry 14; a patterned layer of insulator material defining spacer structures 18a, 18b; and a liquid crystal alignment layer 16 (e.g., a rubbed polyimide layer), which (together with another liquid crystal alignment layer 16 on the opposite side of the LC material 20) functions to control the orientation of the liquid crystal molecules in the absence of an overriding electric field. The stack of layers 14 defining control circuitry may e.g. comprise a stack of conductor, semiconductor and insulator layers defining an array of pixel electrodes and active-matrix transistor circuitry to independently control the electric potential at each pixel electrode via conductors outside the active, display area 4 of the display device.

In the example of FIG. 1, the other half-cell comprises another ultra-thin (e.g., 40 microns) plastics support film 10 supporting at least the above-mentioned second liquid crystal alignment layer 16.

At least the LC cell closest to the viewing screen (front) of the display device also comprises a colour filter array (CFA) 12. The CFA 12 comprises an array of red, green and blue (RGB) filters 8 (defining areas whose optical output is switchable using the control circuitry) in a matrix 6 (e.g., black matrix) defining an area whose optical output is not switchable). The RGB filters 8 are each associated with a respective one of the array of pixel electrodes mentioned above. The RGB filters 8 and the matrix 6 therebetween together define the active, display area 4 of the display device.

LC material 20 is contained between the liquid crystal alignment layers 16 of the two-half cells in the space partially defined by the spacer structures 18*a*, 18*b*.

The two LC cells are adhered together (by adhesive (not shown)) with precise positioning to align the pixel electrode array of one LC cell to the pixel electrode array of the other LC cell.

The spacer structures 18*a*, 18*b* form an integral part of one of the half-cells. The production of the spacer structures 18*a*, 18*b* involves an irradiative technique such as e.g. photolithography. A layer of photoresist material (not shown) is formed over a layer of spacer structure material formed in situ on the stack 14 defining the electrical control circuitry. A radiation image (positive or negative, depending on the type of photoresist used) of the desired spacer structure pattern is projected (e.g., using a mask in contact with the resist, or a mask distant from the resist) onto the resist using radiation at a frequency that induces a change in the solubility of the resist material, and thereby create a latent solubility image in the resist layer. This latent solubility image is developed, and the resulting patterned resist layer is used as a mask to pattern the underlying layer of spacer structure material.

FIGS. 3-6 show different examples for the radiation images projected over (at least) the active area of the device for each LC cell. Only a portion of the active area is shown in FIGS. 3-6, but this is sufficient to show how the radiation image extends over (at least) the whole active area of the device. Each of FIGS. 3-6 shows how the radiation images are aligned to the active area of the display device, by also showing the location of the RGB filters 8 and matrix 6 in the finished device. The radiation image projected onto the photoresist layer may also extend outside the active area 4 to form spacer structures outside the active area, and the radiation image outside the active area 4 may or may not have the same pattern as the radiation image within the active area 4. The pattern of spacer structures in each LC cell of the finished LC device at least substantially matches the respective radiation image pattern used to produce the spacer structures for that LC cell, even if some distortion arises in an individual LC cell as a result of e.g. thermal distortion of the plastics support film 10 during processing after projecting the radiation image onto the resist layer. The resulting spacer structure patterns for the two LC cells are intentionally different from each other in the finished LC device, and the differences between the two spacer structure patterns will have at least an ordered aspect arising from the deliberate projection of different radiation image patterns onto the active area as part of the process of patterning the spacer structure material layer. There may also be a secondary, unordered element to the differences between the two spacer structure patterns in the finished LC device (arising e.g., from uncontrollable distortions of the ultra-thin plastics support films 10 during processing), but this unordered element is secondary and of smaller magnitude than the ordered differences arising from the above-mentioned deliberate use of different radiation image patterns for forming the spacer structures.

Figure 3:
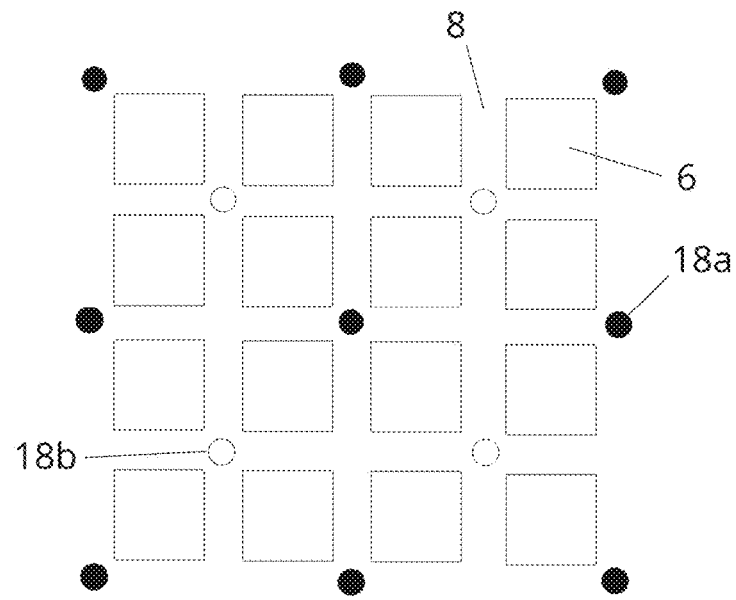
FIG. 3 shows one example for the arrangement of the spacer structures in the device of FIG. 1.

In the example of FIG. 3, the radiation image for one of the two LC cells comprises an ordered array of circular spots (solid black circles 18*a* in FIG. 3), and the radiation image for the other of the two LC cells also comprises an ordered array of circular spots (unshaded circles 18*b* in FIG. 3). Both the solid black circles 18*a* and the unshaded circles 18*b* are located at vertices of respective square/rectolinear grid patterns and are arranged at the same pitch distance in both x and y directions. In relation to the pattern of RGB filters 8, the pattern of solid black circles 18*a* is offset from the pattern of unshaded circles 18*b* by a distance substantially equal to half the pitch distance, in both the x and y directions.

Figure 4:
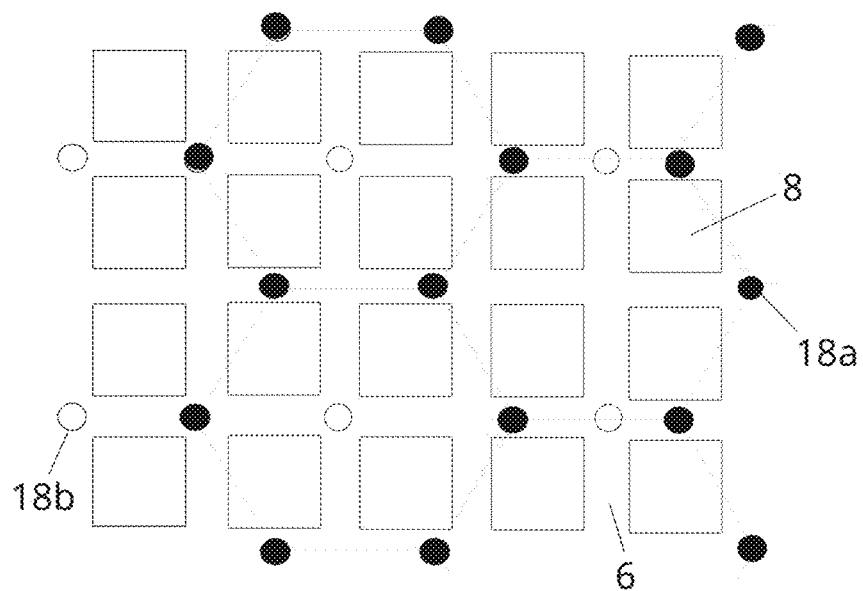
FIG. 4 shows a second example for the arrangement of the spacer structures in the device of FIG. 1.

FIG. 4 shows a second example for the projected radiation images for the two LC cells. In this second example: the projected radiation image for one of the two LC cells comprises an array of circular spots (black solid circles 18*a* in FIG. 4) located at the vertices of a substantially but not completely regular hexagonal grid pattern; and the projected radiation image for the other of the two LC cells comprises an array of circular spots (unshaded circles 18*b* in FIG. 4) located at the vertices of a square grid pattern. In this example, the hexagonal grid pattern is as regular as possible while limiting the vertices to locations outside the RGB filter areas 8 (i.e. all within the matrix area 6). In one variation example, the hexagonal grid pattern is perfectly regular, and some vertices may lie within the RGB filter areas 8. In the examples described above, the pixel electrode pattern is the same for both the two LC cells and substantially coincides with the pattern of the RGB filters 8. In yet another variation example, the pixel electrode pattern of one of the two LC cells instead comprises an array of relatively large area (compared to the RGB filters) regular hexagonal pixel electrodes 8, and the projected radiation image for that one of the two LC cells comprises an array of circular spots located at the vertices of a perfectly regular hexagonal grid pattern all outside the pixel electrode areas 8 (and all outside the RGB filter areas 8 and within the matrix area 6). For example, the above-mentioned hexagonal pixel electrodes (arranged at a pitch distance greater than that of the RGB filters) may form part of the rear grey-level LC cell, in a high-dynamic-range display.

Figure 5:
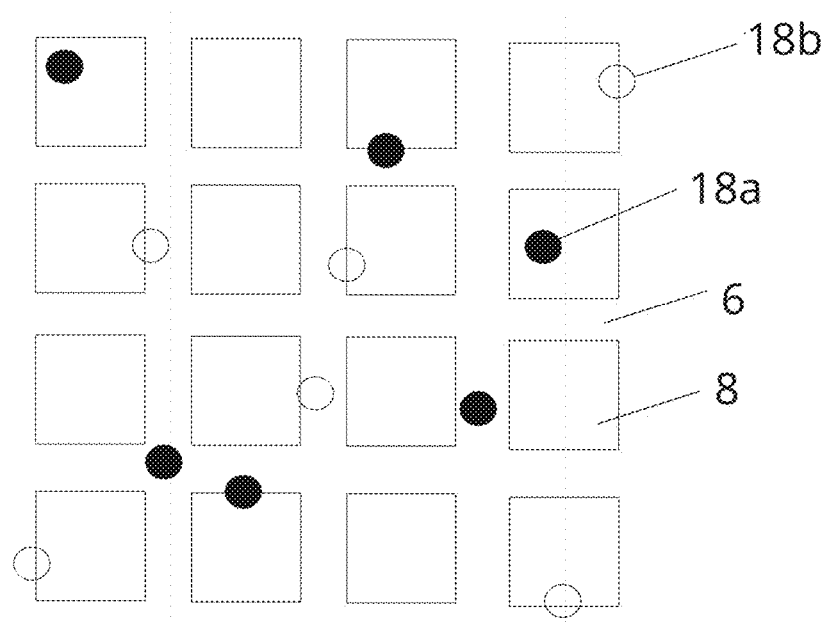
FIG. 5 shows a third example for the arrangement of the spacer structures in the device of FIG. 1.

FIG. 5 shows a third example for the projected radiation images for the two LC cells. In this third example: each projected radiation image comprises a respective random arrangement of circular spots (shown in FIG. 5 by black solid circles 18*a* for one LC cell and by unshaded circles for the other LC cell). Each arrangement is wholly random over the whole active area 4, with some spots 18*a*, 18*b* being located fully or partially in the RGB filter areas (output switchable areas) 8. In one variation example, the projected radiation image for one of the two cells comprises a random arrangement of circular spots, and the projected image for the other of the two cells comprises an ordered arrangement of the kind described above. In yet another variation example, the same image projection mask (for projecting an image comprising a random arrangement of circular spots) is used for both LC cells, and the positioning and/or orientation of the image projection mask relative to the display area is different between the two LC cells. For example, the lateral position (in a direction parallel to the display area) of the image projection mask for one of the two LC cells is offset from the lateral position of the same image projection mask of the other two LC cells by an amount greater than the expected alignment tolerance), and/or the orientation of the image projection mask (in a plane parallel to the display area) for one of the two LC cells is rotated (by e.g., 180 degrees) with respect to the orientation of the same image projection mask for the other of the two cells.

Figure 6:
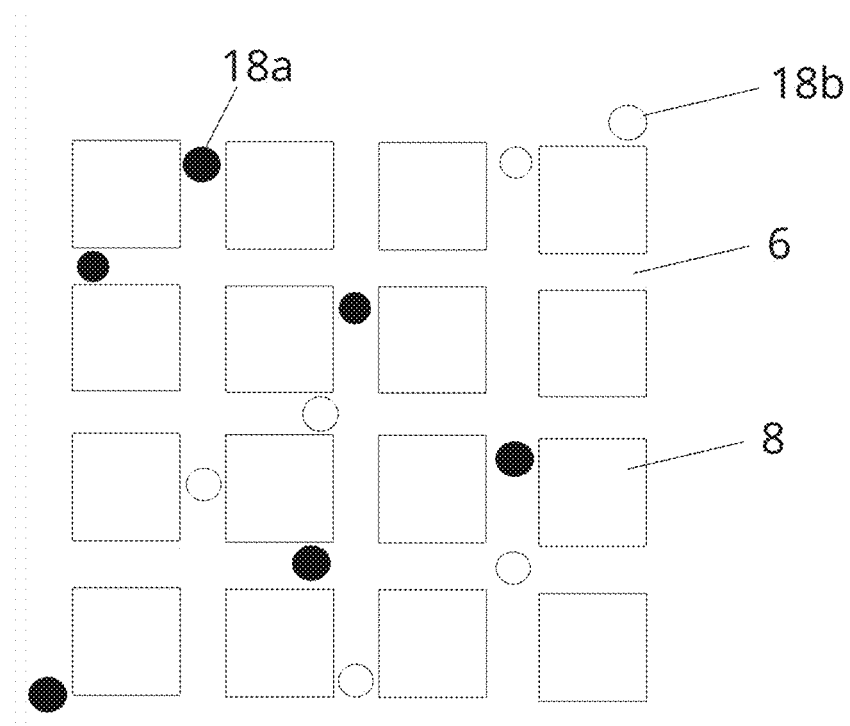
FIG. 6 shows a fourth example for the arrangement of the spacer structures in the device of FIG. 1.
Figure 7:
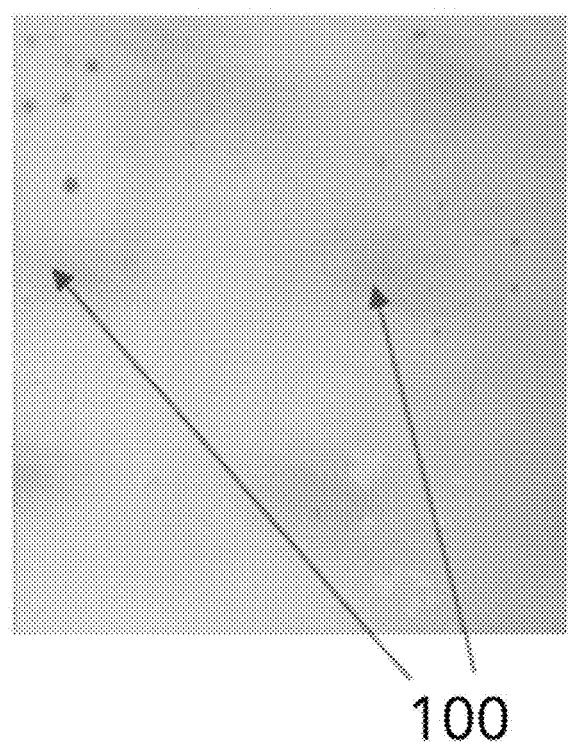

FIG. 6 shows a fourth example for the projected radiation images for the two LC cells. In this fourth example: each projected radiation image comprises a respective pseudo-random arrangement of circular spots (shown in FIG. 5 by black solid circles 18a for one LC cell and by unshaded circles 18b for the other LC cell). Each arrangement is pseudo-random in relation to the whole active area 4, because the location of spots 18a, 18b is excluded from the RGB filter areas 8 of the device (i.e. limited to the matrix area 6 of the active area 4), and the spots are arranged randomly within the matrix area 6. the same image projection mask (for projecting an image comprising a pseudo-random arrangement of circular spots) is used for both LC cells, and the lateral position (in a first direction parallel to either the rows or columns of the RGB filters 8) of the image projection mask for one of the two LC cells is offset from the lateral position of the same image projection mask of the other two LC cells by an distance equal to an integer of the pitch distance of the RGB filters in the first direction.

Figure 8:
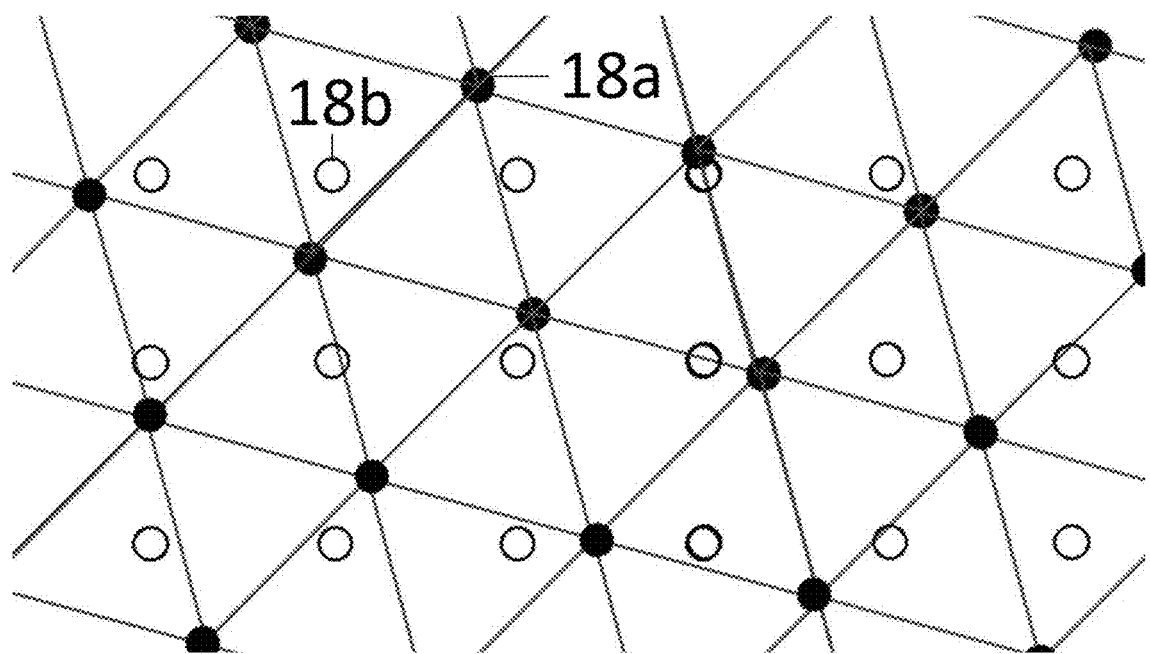
FIGS. 8 and 9 show a fifth example for the arrangement of the spacer structures in the device of FIG. 1.
Figure 9:
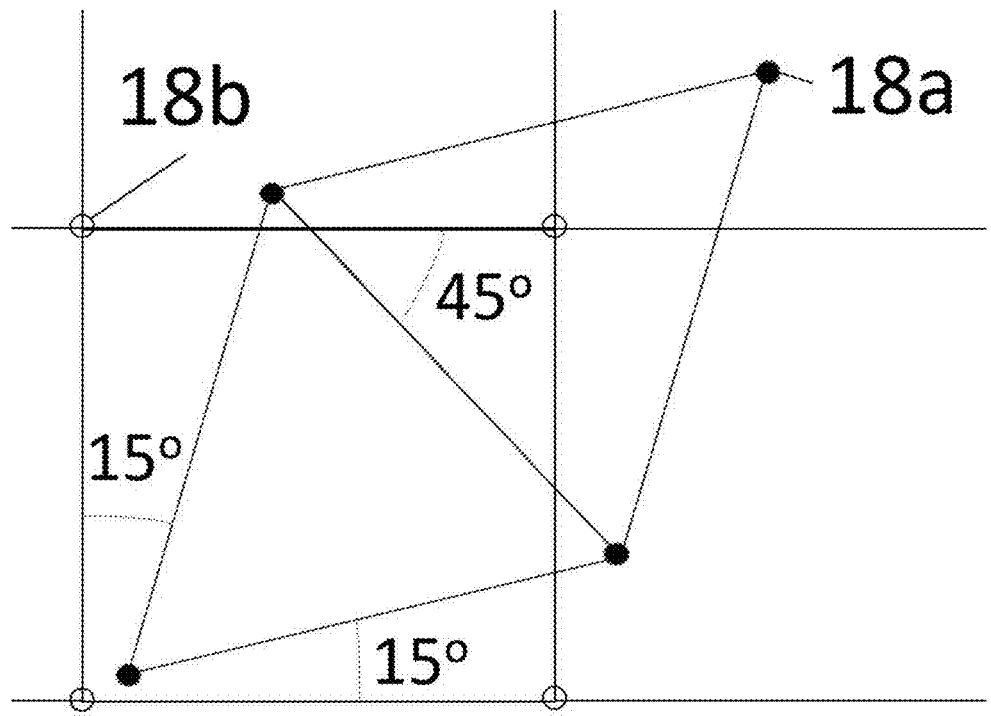

FIGS. 8 and 9 show a fifth example for the projected radiation images for the two LC cells. In this fifth example: the projected radiation image for one of the two LC cells comprises an array of circular spots (black solid circles 18a in FIG. 4) located at the vertices of a triangle grid pattern (e.g., equilateral triangle grid pattern); and the projected radiation image for the other of the two LC cells comprises an array of circular spots (unshaded circles 18b in FIG. 4) located at the vertices of a quadrilateral grid pattern (e.g., square grid pattern). The triangular grid pattern and the quadrilateral grid pattern are oriented relative to each other such that none of the sides of the triangular grid units of the triangular grid pattern align with any of the sides of the quadrilateral grid units of the quadrilateral grid pattern. In the example shown in FIGS. 8 and 9, the triangular grid pattern is oriented at an angle of about 15 degrees relative to the quadrilateral grid pattern; there is a minimum angle of about 15 degrees between any side of the triangular grid units of the triangular grid pattern and any side of the quadrilateral grid units of the quadrilateral grid pattern. The quadrilateral grid pattern of spacers 18b may or may not be aligned with the pattern of the RGB filters 8. In one example, the quadrilateral grid pattern of spacers 18b is aligned with the pattern of RGB filters 8, and the vertices of the quadrilateral grid pattern within the display/active area all coincide with the matrix area 6. In the example of FIGS. 8 and 9, the two arrays of spacers have the same individual spacer dimension (e.g., 20 micron diameter) and the same spacer density (proportion of unit area occupied by spacers (e.g. 0.025 or 2.5%)). In other examples, the two arrays of spacers may have different spacer dimensions and/or spacer densities.

The side length a of the equilateral triangle grid unit of an equilateral triangular grid pattern (which is equal to the distance between the centres of adjacent spacers of the equilateral triangular grid pattern of spacers 18a) may be calculated from the spacer diameter r (e.g. 10 microns) and the spacer density SD (e.g. 0.025 or 2.5%) according to the following formula:

$$a = \sqrt{\frac{\pi r^2 \times 1/SD}{\sin 60°}}$$

The side length b of the square grid unit of a square grid pattern (which is equal to the distance between the centres of adjacent spacers of the square grid pattern of spacers 18b) may be similarly calculated from the spacer diameter r and spacer density SD according to the following formula:

$$b = \sqrt{\pi r^2 \times 1/SD}$$

In this fifth example, the pixel electrode pattern may be the same for both the two LC cells and substantially coincide with the pattern of the RGB filters 8; or the pixel electrode pattern of one of the two LC cells may instead comprise an array of relatively large area (compared to the RGB filters) pixel electrodes 8, For example, the above-mentioned large area pixel electrodes (arranged at a pitch distance greater than that of the RGB filters) may form part of the rear grey-level LC cell, in a high-dynamic-range display.

As mentioned above, the inventors for the present application have observed distinct brightness variations in multi-cell LC devices in which the spacer structures of each LC cell are produced by a technique comprising projecting the same highly-ordered radiation image onto the active area to pattern a layer of spacer structure material. Without wishing to be bound by theory, the inventors have attributed these distinct brightness variations to the spacer structure patterns in each finished LC cell becoming misaligned slightly from each other (and from the radiation image pattern projected onto the active area for producing the spacer structures), and in particular to small variations in the misalignments over the active area.

Multi-cell LC devices produced according to the techniques described above all exhibit markedly less distinct variations in brightness over the active area when a uniform backlight is viewed through the LC device. A change in the frequency of the variations in brightness and/or the size of the difference in brightness between areas of different brightness makes the variations less distinct/noticeable to the human eye.

The spacer patterns for the two LC cells are configured relative to each other such that there is no risk of the two spacer patterns coming close to coinciding with each other, even with the maximum amount of positional misalignment possible with the process of aligning the two LC cells. Increasing the pitch distance between spacers in the spacer patterns increases the range of positional misalignment that can be tolerated without resulting in a risk of the two spacer patterns coming close to coinciding with each other.

As mentioned above, example embodiments of the present invention are described above for the example of a colour display device, but the techniques are equally applicable to other kinds of LC devices, such as LC devices for which the whole active area is output switchable, such as adaptive LC lens devices comprising a stack of LC cells controllable to produce different refractive index patterns in the LC material.

Examples of techniques according to the present invention have been described in detail above with reference to specific process details and device features, but the technique is more widely applicable within the general teaching of the present application. Additionally, and in accordance with the general teaching of the present invention, a technique according to the present invention may include additional process steps/device features not described above, and/or omit some of the process steps/device features described above.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A liquid crystal (LC) device comprising a stack of at least first and second LC cells in optical series; wherein the first LC cell comprises LC material contained between two components of the first LC cell in a space at least partially defined by first spacer structures forming an integral part of one or both of the components of the first LC cell; wherein the second LC cell comprises LC material contained between two components of the second LC cell in a space at least partially defined by second spacer structures forming an integral part of one or both of the components of the second LC cell; and wherein an arrangement within an active area of the device of the first spacer structures is different to an arrangement within the active area of the device of the second spacer structures; wherein the first spacer structures are substantially located at the vertices of a first type of grid pattern, and the second spacer structures are substantially located at the vertices of a different, second type of grid pattern; wherein the first type of grid pattern comprises a quadrilateral grid pattern and the second type of grid pattern comprises a triangle grid pattern; or wherein the first type of grid pattern comprises an equilateral triangle grid pattern and the second type of grid pattern comprises a quadrilateral grid pattern; or wherein the first type of grid pattern comprises a square grid pattern, and the second type of grid pattern comprises a hexagonal grid pattern.

2. A liquid crystal (LC) device comprising a stack of at least first and second LC cells in optical series; wherein the first LC cell comprises LC material contained between two components of the first LC cell in a space at least partially defined by first spacer structures forming an integral part of one or both of the components of the first LC cell; wherein the second LC cell comprises LC material contained between two components of the second LC cell in a space at least partially defined by second spacer structures forming an integral part of one or both of the components of the second LC cell; and wherein an arrangement within an active area of the device of the first spacer structures is different to an arrangement within the active area of the device of the second spacer structures; wherein the first spacer structures are substantially located at the vertices of a first type of grid pattern, and the second spacer structures are substantially located at the vertices of a different, second type of grid pattern; wherein the active area of the device comprises output switchable areas and a matrix area; wherein the first and second grid patterns are both regular grid patterns; and wherein at least one of the first and second grid patterns comprises one or more vertices located in one or more of the output switchable areas.

3. The liquid crystal device of claim 1, wherein the first and second grid patterns are oriented relative to each other such that none of the sides of the grid units of the first grid pattern align with any of the sides of the grid units of the second grid pattern.

4. The liquid crystal device of claim 1, wherein the arrangements of the first and second spacer structures exhibit a common pitch within the active area of the device, and the arrangements of the first and second spacer structures within the active area of the device are configured such that no first spacer structure of coincides with any of the second spacer structures in terms of position within the active area of the device.

5. The liquid crystal device of claim 1, wherein the active area of the device comprises output switchable areas and a matrix area, and wherein the first and second types of grid patterns are configured such that all vertices are located outside output switchable areas of the active area.

6. The liquid crystal device of claim 2, wherein the first type of grid pattern comprises a quadrilateral grid pattern and the second type of grid pattern comprises a triangle grid pattern.

7. The liquid crystal device of claim 6, wherein the first type of grid pattern comprises an equilateral triangle grid pattern and the second type of grid pattern comprises a quadrilateral grid pattern.

8. The liquid crystal device of claim 1, wherein the equilateral triangle grid pattern is oriented at an angle of about 15 degrees relative to the quadrilateral grid pattern.

9. The liquid crystal device of claim 2, wherein the first type of grid pattern is a square grid pattern, and the second type of grid pattern is a hexagonal grid pattern.

10. A method of producing a liquid crystal (LC) device comprising a stack of at least first and second LC cells in optical series, the first LC cell comprising LC material contained between two components of the first LC cell in a space created by first spacer structures forming an integral part of one or both of the components of the first LC cell, the second LC cell comprising LC material contained between two components of the second LC cell in a space at least partially defined by second spacer structures forming an integral part of one or both of the components of the second LC cell, wherein an arrangement within an active area of the device of the first spacer structures is different to an arrangement within the active area of the device of the second spacer structures; wherein the first spacer structures are substantially located at the vertices of a first type of grid pattern, and the second spacer structures are substantially located at the vertices of a different, second type of grid pattern; wherein the first type of grid pattern comprises a quadrilateral grid pattern and the second type of grid pattern comprises a triangle grid pattern; or wherein the first type of grid pattern comprises an equilateral triangle grid pattern and the second type of grid pattern comprises a quadrilateral grid pattern; or wherein the first type of grid pattern comprises a square grid pattern, and the second type of grid pattern comprises a hexagonal grid pattern, wherein production of the first spacer structures comprises: patterning a first spacer structure material layer at least within the active area of the device by an irradiative technique comprising projecting onto the active area a first radiation image of a pattern for the first spacer structures for the active area; and production of the second spacer structures comprises patterning a second spacer structure material layer within the active area of the device by an irradiative technique comprising projecting onto the active area a second radiation image of a pattern for the second spacer structures for the active area.

11. The method of claim 10, wherein the equilateral triangle grid pattern is at oriented at an angle of about 15 degrees relative to the quadrilateral grid pattern.

12. The method of claim 10, wherein the first and second radiation images are images of ordered spacer structure patterns both exhibiting a common pitch within the active area of the device, wherein the two ordered spacer structure patterns are configured relative to each other such that no first spacer structure coincides with any of the second spacer structures in terms of position within the active area.

13. The method of claim 10, wherein the active area of the device comprises output switchable areas and a matrix area, and wherein the first and second grid patterns are configured such that all vertices are located outside output switchable areas of the active area.

\* \* \* \* \*